United States Patent [19]
Garrett et al.

[11] Patent Number: 5,842,817
[45] Date of Patent: *Dec. 1, 1998

[54] PIPE COMPRESSION RING

[75] Inventors: Thomas M. Garrett, Corona, Calif.;
Lewis J. Bertalotto, Pittsburg, Kans.;
Serguei Savinov, New Haven, Conn.

[73] Assignee: MCP Industries, Inc., Corona, Calif.

[*] Notice: This patent issued on a continued prosecution application filed under 37 CFR 1.53(d), and is subject to the twenty year patent term provisions of 35 U.S.C. 154(a)(2).

[21] Appl. No.: 623,017

[22] Filed: Mar. 28, 1996

[51] Int. Cl.⁶ .................................. E03F 3/04; F16L 1/00
[52] U.S. Cl. ........................................... 405/184; 285/335
[58] Field of Search ..................... 405/184; 285/335, 285/369, 370, 371, 379

[56] References Cited

U.S. PATENT DOCUMENTS

| | | | |
|---|---|---|---|
| 4,091,630 | 5/1978 | Nemoto et al. | 405/184 |
| 4,552,485 | 11/1985 | Hammer | 405/184 |
| 4,898,498 | 2/1990 | Akesaka | 405/184 |
| 5,165,822 | 11/1992 | Hein | 405/184 |
| 5,316,352 | 5/1994 | Smith | 285/370 |

OTHER PUBLICATIONS

Kevin John Ripley, Ph.D.; Thesis, University of Oxford; Hilary Term, 1989; "The Performance of Jacked Pipes".

G.W.E. Milligan; K.J. Ripley; *Proc.*; 4th Int. Conf. on Trenchless Technology, London; Int, Soc. For Trenchless Technology; London, 1989; Paper 2.1; "Packing Material in Jacked Pipe Joints".

P Norris; G.W. E. Millgian; *Proc.*, NO–DIG 92, Washington, D.C., N. Amer. Soc. for Trenchless Technology; Chicago, 1992; Paper H3; "Pipe End Load Transfer Mechanisms During Pipe Jacking".

Robert Lys, Jr., P.E.; Thomas M. Garrett, Ph.D.; Microtunneling Forces; The Pipe's Perspective; *Underground Pipeline Engineering*; Jun. 25–28, 1995.

*No Dig Microtunneling Pipe*; Division of MCP Industries, Inc.; Apr. 28, 1995 Brochure.

Pipe Bursting With No Dig Pipe Brochure.

*Primary Examiner*—Tamara L. Graysay
*Assistant Examiner*—Tara L. Mayo
*Attorney, Agent, or Firm*—Litman, McMahon & Brown, L.L.C.

[57] ABSTRACT

A compression or jacking ring includes a first component constructed of two layers of a material that is comparatively non-elastic and has a Poisson's ratio preferably not greater than 0.3. A second component that is comparatively elastic and has a comparatively high Poisson's ratio is sandwiched between sections of the first component. The compression ring is sized and shaped to be positioned between facing surfaces of pipe sections in a string of pipe sections utilized for forming a pipe within a pipe receiving tunnel. In particular, the compression ring is constructed to transfer a load between adjacent pipes during insertion of the pipes into a tunnel so as to spread the load over a comparatively large surface area if the pipe sections become non-axially aligned relative to one another during insertion so as to reduce the likelihood of breakage.

8 Claims, 4 Drawing Sheets

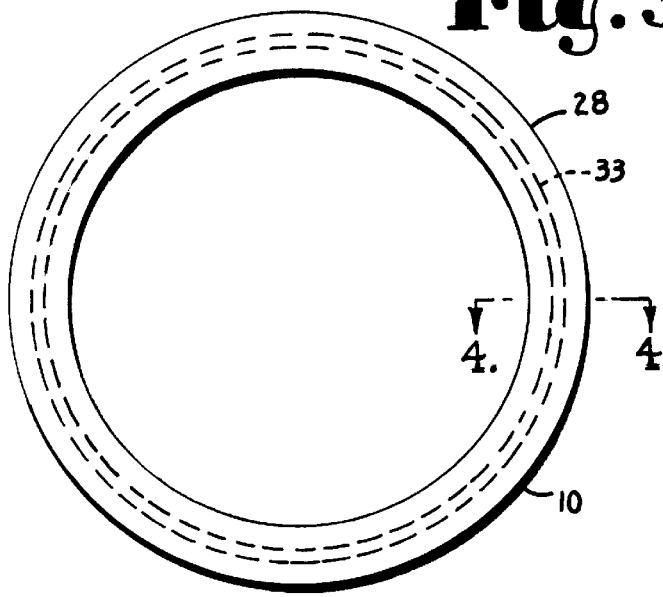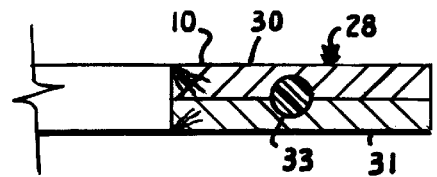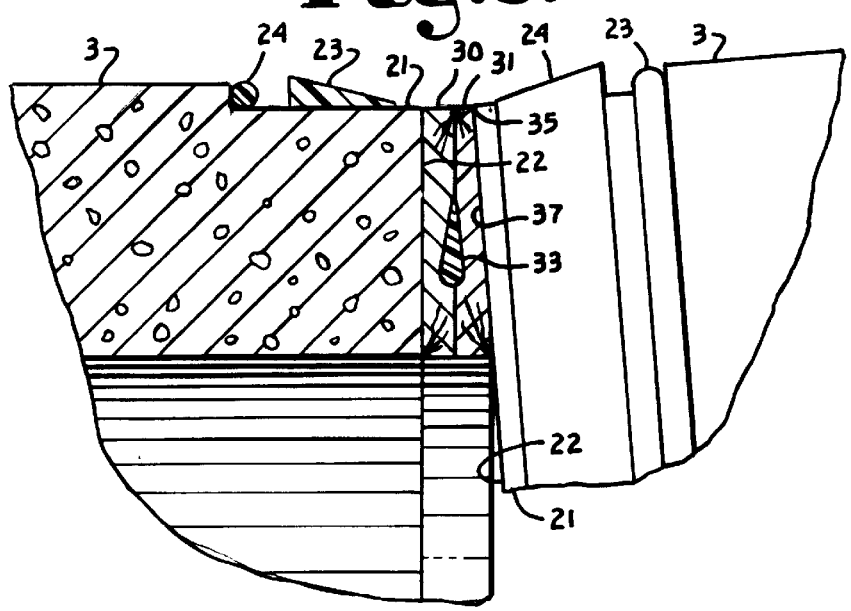

PIPE COMPRESSION RING

BACKGROUND OF THE INVENTION

The present invention is directed to a compression ring and, in particular, to a compression ring for advantageously transferring a load from one pipe to an adjacent pipe during a trenchless pipe installation or microtunneling procedure.

Underground piping for various utilities, especially sewer piping, was originally placed in the ground by trenching operations. With modern day urban sprawl trenching operations are inconvenient or almost impossible to utilize. Often major roadways or even buildings may be in the path of proposed pipelines. Trenching can also be dangerous due to the possibility of collapse of trenches onto workers. Consequently, trenchless procedures, including procedures generally referred to as microtunneling, have become quite popular.

Trenchless procedures in general allow for placement of pipes in the ground by forming tunnels sized just large enough to hold the pipe. Such tunnels are often formed by use of hydraulic jacks that are utilized to drive the pipe through the ground.

One type of trenchless procedure, generally referred to as microtunneling utilizes a microtunneling boring machine or digging mole to excavate a tunnel ahead of a string of pipe and the pipe is simultaneously pushed from behind through the tunnel so as to follow the mole. Another trenchless procedure, utilized where a pipeline is replacing a pre-existing smaller or damaged pipeline, is generally referred to as a pipe bursting procedure. In the pipe bursting procedure, a tow pipe or rod that is smaller than the original pipe can be extended through the original pipe and connected to a bursting tool that is essentially a tapered head having an outer diameter approximating the size of the pipe to be installed. The head of the bursting tool is drawn through the preexisting pipe by the rod so as to both break and expand radially outward the preexisting pipe to make an enlarged opening for the new pipe which is pushed from behind into the opening created by the bursting tool. In pipe bursting procedures, the head may also be pushed through the old pipe by application of pressure to the rear of the new pipe.

Trenchless piping is constructed of clay, concrete reinforced polymers, of the like and is available in various diameters and section lengths.

In a microtunneling procedure the pipe is lowered through a vertical shaft to the level of the new pipe line and pressed or urged into the tunnel created by a mole or bursting head by a jacking mechanism exerting substantial pressure so as to produce a loading force against the end of the rearward end of the pipe. Once each pipe is pushed into the opening or tunnel being created, the jacking mechanism is reversed and a new pipe is added to the string after which the procedure is repeated until the pipe string links with another vertical shaft.

Substantial forces are exerted against the pipe during any of the trenchless procedures. Pressures of a hundred tons or more are often applied to the pipe to push it through the ground. The pipe is designed to be able to withstand the substantial forces exerted against it, provided that those forces are exerted uniformly over the end of the pipe. That is, as long as the pipe string extends outwardly in a straight line and all of the forces that are exerted against the rear of the pipe string are translated parallel to the main axis of the pipe string, the pipe is normally able to withstand almost any force that can be applied during such procedures.

A problem occurs, however, if one piece of pipe in the pipe string begins to become non-coaxially aligned with respect to the pipe adjacent to it. As pipe strings may extend out typically three to five hundred feet, it is not uncommon for adjacent pipes to become somewhat misaligned relative to one another. This is especially true where the installer is trying to somewhat guide or steer the pipe string by selective application steering jacks associated with and controlling the digging direction of the mole. When the pipes become non-coaxially aligned, adjacent pipe faces rotate relative to each other thereby opening an associated joint and placing substantial load and stress on the edges of the faces that remain in contact. Non-axial alignment of the pipe also causes centrifugal or radially outward forces to be applied at the point of misalignment. While the pipe, such as clay pipe, can withstand a substantial amount of application of pressure in the axial direction, it has much less ability to withstand edge stress and centrifugal forces applied thereto. Consequently, pipe often breaks during installation where adjacent sections become misaligned.

Also during installation of the pipe string, where two adjacent pipes become non-coaxially aligned, most of the load of the applied jacking force is transferred between touching interfaces that are relatively small in area between the adjacent sections of pipe. That is, when adjacent sections of pipe are coaxially aligned they typically have a large ring like circular surface which engages. The pressure exerted against the pipe string at the rear is, thus, transferred along the string across such adjacent surfaces which have a comparatively large surface area. Consequently, the pressure per square inch is comparatively low. When the pipes begin to become non-coaxially aligned and the joint opens, the two adjacent pipes no longer mate across the entire surface, but typically just at a relatively small edge surface. Consequently, the pressure per square inch of mating surface increases comparatively by a large amount at the same time as greater centrifugal forces are being applied to the pipe, so as to further increase the likelihood of failure at such a location. Abrasion between the two touching surfaces is also more likely to occur and cause damage.

In order to spread out the force applied between the pipes as evenly as possible, compression rings have historically been utilized between adjacent sections of the pipe string. The principal purpose of such compression rings is not to seal between the pipes, but rather to transfer the jacking load across as large an area as possible between adjacent pipe sections.

Prior art theory and testing has indicated that the compression rings need to be constructed of a material which has a comparatively very low Poisson's ratio in compression. Poisson's ratio is a measurement of the traverse contracting strain to elongation strain when a material is stretched by forces that are applied at each its ends and which are parallel to the material's axis. In the present situation we are considering the Poisson's ratio as it is related to material in compression rather than elongation so the general definition terms are reversed, but the effect is the same. Consequently, materials that have low Poisson's ratios in compression are typically materials that may or may not collapse somewhat upon compression, but essentially do not expand outwardly upon compression. It has historically been found that wood has been suitable for use in compression rings where it is desired for the compression ring to have a comparatively low Poisson's ratio. Therefore, prior art compression rings have historically been constructed of wood fiber and have included plywood, particle board or the like. It has also been preferred that these prior art compression rings be relatively thick and wet during use.

Studies have shown that materials that have relatively high Poisson's ratios, such as highly elastic elastomers, liquids and the like have historically been ineffective for use as materials of construction of compression rings. One possible reason for this failure is that the materials having high Poisson's ratios squeeze to the side during loading and are likely to allow direct or almost direct contact between adjacent pipe surfaces. Such contact is more likely to lead to greater centrifugal forces applied directly from one pipe to the other and abrasion damage leading to potential failure. Even if contact does not occur, high Poisson's ratio materials have been in general considered less satisfactory as a material of construction of compression rings, as compared to low Poisson's ratio materials by those skilled in the art. Therefore, while seals have been made of elastomeric material that has a relatively high Poisson's ratio, such material has been deemed unsuitable for use in conjunction with compression rings.

While the compression rings of the current state of the art are suitable in many situations, such rings still lead to an unacceptably high rate of failure of the pipes. Consequently, it is desirable to develop compression rings which reduce the potential for failure during installation of the pipes.

SUMMARY OF THE INVENTION

The present invention is directed to a compression ring for use between two facing ends of pipe sections in a string of pipe sections utilized for completing a trenchless pipe installation procedure. The overall ring is annular in shape and has opposed sides that abut against faces of facing ends of adjacent pipe sections. Preferably the sides of the ring are sized and shaped to at least cover adjacent faces of the pipe sections.

The ring is constructed of two dissimilar materials. In particular, preferably the largest portion or first component of the ring is constructed of a first material having a relatively low Poisson's ratio which may or may not compress substantially when force is applied axially along the pipe sections, but which does not substantially squeeze radially outward in an elastomeric fashion. Preferably the first component is externally located on the ring and engages the pipe faces on opposite sides of the ring; however, in some embodiments the first component may be interior. The material of construction of the first component is also preferably a non-brittle and non-abrasive material.

A second component of the ring is constructed of a material which has a comparatively high Poisson's ration and which does expand radially, especially under a pinching force. Preferably, the second component or elastomeric material relaxes when an axial force is applied through the pipe string, but has a tendency to squeeze away from a pinched point or region when an uneven force is applied or a centrifugal force is applied to the compression ring during installation of the pipe string. In the manner, when an uneven force is applied to the compression ring, the elastomeric material tends to be urged away from the point of greatest load or force so as to be squeezed radially outward. This has a tendency to enlarge or elongate the surface along which the force is evenly applied so that the loading per square inch of surface is reduced and so that there is less likelihood of failure of the pipe at the point of impact.

The first and second components are layered such that there is a layer of each that exist between adjacent pipe end faces during use. In this manner the first component prevents contact between the pipe faces and the second component spreads or distributes the load over a larger surface area if the pipes become nonaxially aligned. It has been found that the use of the combination of dissimilar materials of this type reduces the load per square inch while still preventing the adjacent pipe sections from coming in close contact and abrading one another. This in turn reduces the likelihood that the pipe sections will fail during installation.

For purposes of the present application, a material having a high Poisson's ratio is considered to be a material having a ratio substantially greater than 0.3 and a material of low Poisson's ratio is a material having a ratio less than 0.3.

Preferably under the present invention, the first component is a wood fiber such as plywood or another construction material manufactured from glued wood fibers such as particle wood or chip board to form an opposed pair of outer sections of the ring. Also preferably the second component is circular in cross section and constructed of polyurethane elastomer. Preferably, the second component is also centered between and sandwiched between two sections of the first component, although layers of equal size or the like could be utilized. However, it is foreseen that a wide variety of configurations in shape, placement and relative size can occur between the first and second components in accordance with the present invention.

OBJECTS AND ADVANTAGES OF THE INVENTION

Therefore, the objects of the present invention are to: to provide a compression ring for use in installation of pipe sections in a trenchless procedure wherein the compression ring utilizes two dissimilar materials to spread the driving or jacking force transferred between facing ends of the pipe sections so as to reduce likelihood of failure of the pipe sections due to axial centrifugal forces and excessive loads; to provide such a compression ring utilizing a first material having a comparatively high Poisson's ratio and a second material having a comparatively low Poisson's ratio which are joined together in a common unit; to provide such a compression ring wherein the first component that has a comparatively low Poisson's ratio forms a first portion of the ring and the second component that has a relatively high Poisson's ratio forms a second portion of the ring preferably sandwiched between opposed sections of the first component; to provide such a compression ring wherein the first component is a wood fiber that has been glued together and the second component is polyurethane having a circular cross section; and to provide such a compression ring which is comparatively easy to use, inexpensive to produce and especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a front elevational view of the compression ring, showing an interior component of the ring in phantom lines.

FIG. 4 is an enlarged and fragmentary cross sectional view of the compression ring, taken along line 4—4 of FIG. 3.

FIG. 5 is an enlarged and fragmentary side view of two adjacent pipe sections with an associated compression ring wherein the pipe section on the right has been positioned in a very exaggerated axial mis-alignment with the pipe section on the right to better illustrate the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
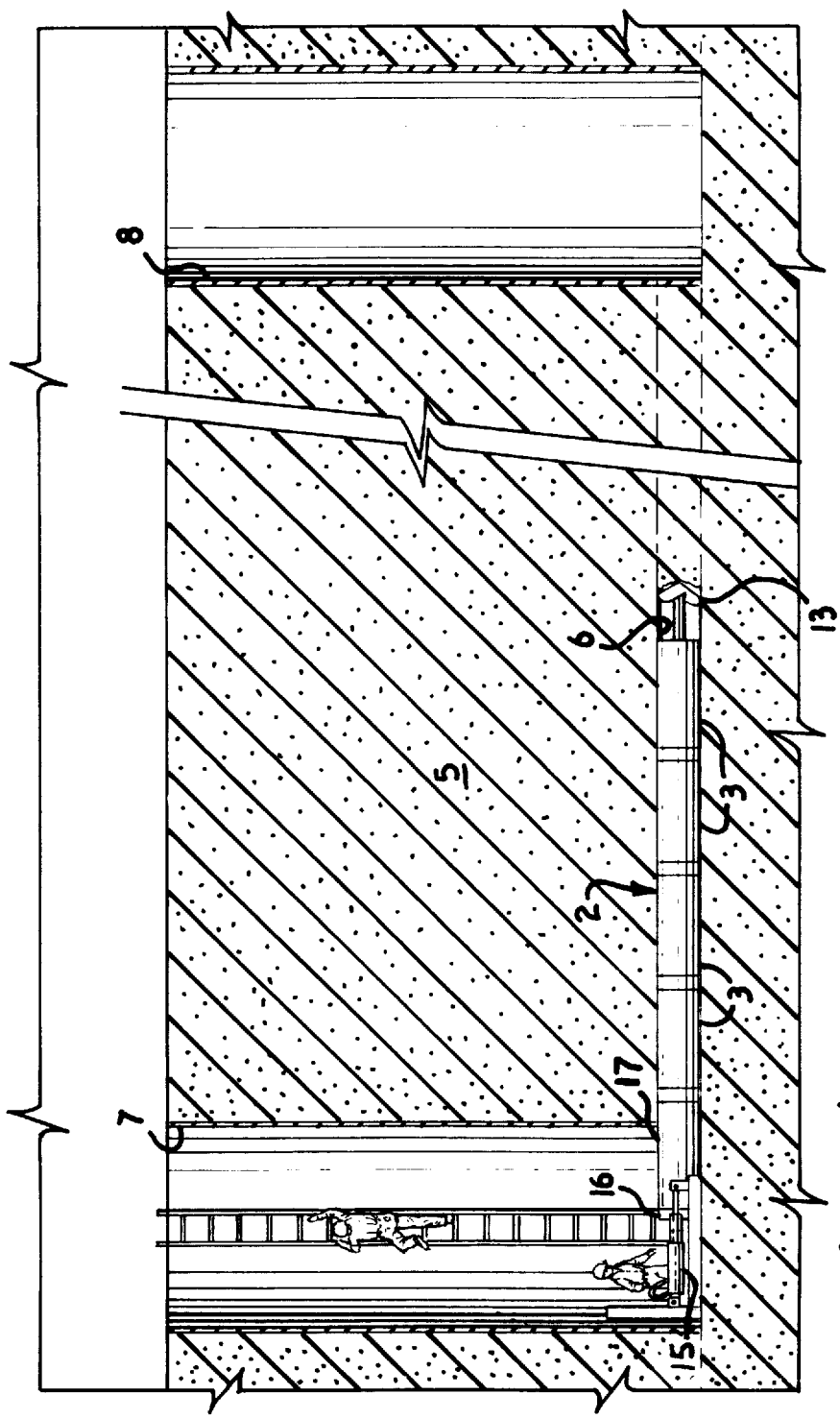
FIG. 1 is a cross sectional view of a section of earth showing a microtunneling procedure wherein a pipe string is driven behind a mole through the soil so as to tunnel between two vertical shafts.
Figure 2:
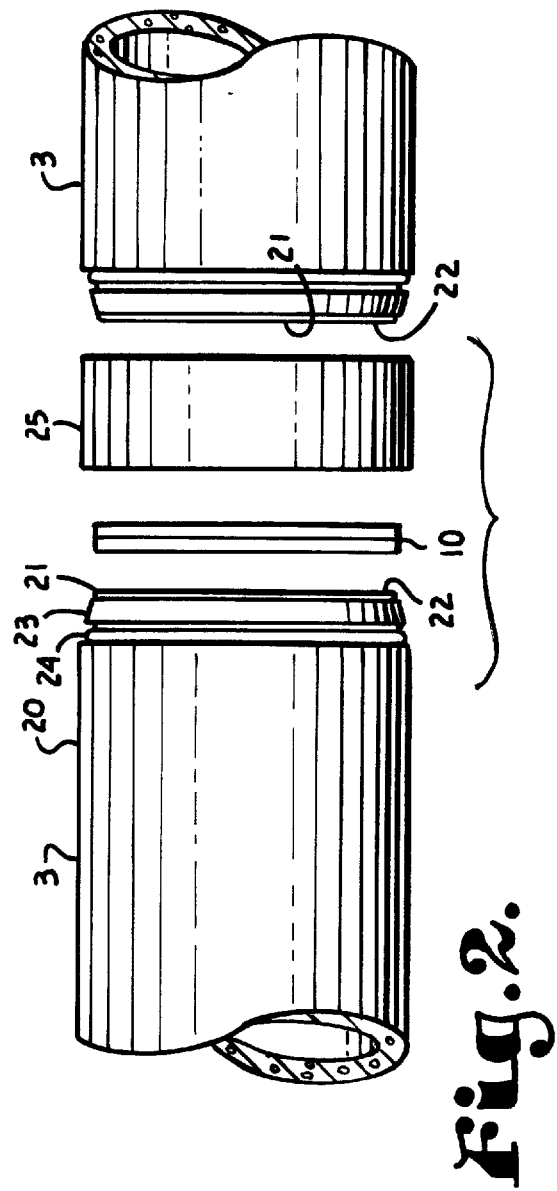
FIG. 2 is a fragmentary and exploded side elevational view of two pipe sections illustrating facing ends of the pipe sections, a compression ring in accordance with the present invention and an exterior sealing ring.

Shown in FIG. 1 is a cross sectional view showing a trenchless pipe installation procedure and, in particular, a microtunneling procedure wherein a string of pipe 2 having a plurality of pipe sections 3 is jacked or driven through soil 5 between two spaced vertical shafts 7 and 8. Shown in FIG. 2 is a partially exploded view of two pipe sections 3 illustrating a jacking ring, load transfer ring or compression ring 10 in accordance with the present invention positioned therebetween.

In the illustrated microtunneling procedure, vertical shafts 7 and 8 along with other shafts, if necessary, are sunk into the soil 5 to an installation depth required for a particular pipe line. The vertical shafts 7 and 8 are typically spaced at distances of three to five hundred feet from one another, although microtunneling procedures can be utilized in conjunction with other distances.

In the microtunneling procedure shown in FIG. 1 a boring machine or mole 13 with a digging head located thereon of approximately the same diameter as a desired pipe tunnel 6 is located at the front of the string of pipe 2. The mole 13 includes steering jacks (not shown) that allow an operator to modify the digging direction of the mole 13 relative to the string of pipe 2. The mole 13 digs through the soil 5 and the resultant loose dirt is conveyed away from the mole 13 by one of several various processes (not shown) which are well known in the art and which include utilization of water conveyed to and away from the mole head by a pair of smaller pipes located in the string of pipe 2 or an auger which runs through the string of pipe 2.

A jack 15 is located in the shaft 7. The jack 15 is a hydraulic jack of the type well know in the art and is designed to apply pressure to the rear 16 of the string of pipe 2. The jack 15 allows for passage of either the above discussed water pipes or auger to discharge through the pipe rear 16 so as to allow removal of the loose dirt from the mole 13, as the mole 13 advances. The jack 15 urges the string of pipe 2 into the pipe tunnel 6 that is produced by the mole 13 until each successive pipe section 3 is sufficiently inserted into the tunnel 6 to allow the jack 6 to be reversed and another pipe section 3 inserted for subsequent driving into the pipe tunnel 6.

The pipe tunnel 6 is aligned to intersect with the vertical shaft 8. In certain types of installation, it may be desirable to guide the pipe string 2. In such situations, a target (not shown but previously known in the art) may be placed within the string of pipe 2 near the mole 13 which is continuously targeted upon by a laser. A camera focused on the target allows an operator to steer the string of pipe 2. When the target is off center, adjustments are made to recorrect the alignment of the string of pipe by modifying the direction of the mole using the associated steering jacks.

Shown in FIG. 2 are fragmentary views of two adjacent pipe sections 3. Each of the pipe sections 3 has a hollow cylindrical or annular shaped main body 20 with an axially extending annular shaped nipple 21 of somewhat smaller diameter extending axially outward from opposite ends thereof. Each nipple 21 has a face 22 which is positioned to be opposite or opposed to a like face 22 on the next adjacent pipe section 3. Surrounding and radially spaced outward from each of the nipples 21 are a pair of seals 23 and 24 that are sleeved on the nipple 21.

An annularly shaped sealing sleeve 25 is operably positioned over and in sealing contact with each of the seals 23 and 24 both during insertion of the pipe 2 into the tunnel 6 and subsequently during use of the pipe 2.

The compression ring 10 is the heart of the invention and is best seen in FIGS. 3 and 4. The compression ring 10 is an annular ring having an inside and outside diameter which approximates the inside and outside diameter of the pipe nipple faces 22. The ring 10 is positioned between the two associated nipple faces 22 during installation of the string of pipe 2 in the tunnel 6 and remains there during usage. The purpose of the ring 10 is to advantageously transfer the load or jacking force exerted by the jack 15 between adjacent pipe sections 3. The jack 15 exerts forces against the rear pipe section 3 that produce a load as much or more than a hundred tons against the rear pipe section. This load is transferred along the string of pipe 2 to the mole 13. The compression ring 10 is utilized to effectively transfer the load between adjacent pipe sections 3, so as to reduce the likelihood of damage to pipe sections 3 during installation.

The ring 10 is seen in cross section in FIG. 4 and consists of two quite dissimilar components. A first component 28 is preferably constructed of a material having a comparatively low Poisson's ratio. The first component 28 of the illustrated embodiment is constructed of a pair of sections 30 and 31 both manufactured from plywood and is exteriorly positioned on each side of the ring 10. Preferably, the first component is non brittle and non abrading. Also preferably the first component physically engages or touches both of the opposed pipe faces 22 during usage, but it is foreseen that other configurations including wherein the first component is an internal layer of the ring may be functional in accordance with the present invention. The section 30 and the section 31 are essentially similar rings and mirror images of one another.

Centrally located and sandwiched between the section 30 and section 31 is a second component having a comparatively high Poisson's ratio. The preferred material of construction of the second component 33 of the illustrated embodiment is polyurethane. Preferably, the second component 33 does not directly touch the pipe faces 22, although in some embodiments it may. The second component 33 and first component 28 are constructed as a unitary ring 10 and the components 28 and 33 synergistically function together to transmit the load between adjacent pipe sections 3.

Suitable high Poisson's ratio materials which may be utilized for the high Poisson's ratio component include virtually all rubbers such as natural rubber, styrene-butadine rubber, ethylene-propylene terpolymer elastomer, and the like, polyurethanes, plasticized polyvinyl chloride, elastic silicones, low density polyethylene, nylons 11 and 12, ethylene acrylic, ethylene vinyl acetate and other elastomers in general both fluorinated and non-fluorinated. It is also noted that liquids satisfy the requirement of having a high Poisson's ratio, but when used in accordance with the invention would require a suitable flexible containing vessel. A preferred polyurethane has a Possion's ratio of about 0.5. The materials having a comparatively low Poisson's ratio (that is lower than approximately 0.3) are wood fiber materials, including wood, plywood, chipboard, particle board, fiber board, as well as certain cellular plastics and foams that do not expand outwardly significantly upon application of pressure and like materials. The pipe section 3 may be constructed of clay, concrete, reinforced polymers or the like.

It is noted that the high Poisson's ratio material is illustrated in the present invention as having a circular cross section positioned in the center of the low Poisson's material component. However, it is foreseen that other configurations could be used in conjunction with the invention and that, for example, the high Poisson's ratio material could constitute essentially an entire layer of the ring having low Poisson's ratio material on either side thereof or some other suitable configuration. Likewise, although the present invention is described in conjunction with a trenchless pipe installation procedure wherein the pipe string is pushed from one end and a mole is utilized for digging through the soil, it is also foreseen that other trenchless type procedures could be used in conjunction with the compression ring of the invention, including pipe bursting digging techniques wherein a bursting tool is drawn through an existing pipe so as to burst it outward and form a pipe receiving tunnel.

Illustrated in FIG. 5 is a view of two adjacent pipe sections 3 and associated compression ring 10 which shows a non axial alignment of adjacent pipe section 3. In actual use two pipe sections 3 would not always become as misaligned axially as the two shown in FIG. 5, but the drawing is utilized here to better illustrate the invention through the positioning of the pipe. The two pipe sections 3 have been rotated about one side thereof so that the pipe faces 22 are no longer parallel to one another and the joint between them has opened on the lower side. In this situation a single edge and most likely a surface not much bigger than a single point of the two facing pipes 3 would engage, if the ring 10 were to be removed. In the present illustration, that edge or point is numbered 35 with respect to the pipe section 3 shown on the right hand side of FIG. 5. If not for the compression ring 10 it would engage the comparatively small surface or similar point on the opposite pipe 3 and virtually the entire load of force exerted against the pipe string 2 would be passed through that very small surface area creating a very large force per square inch.

At the same time the pipe surfaces that are associated with the faces 22 would be angled relative to one another and the forces would not be just axial in nature, but rather some of the forces would also be exerted outwardly or centrifugally at least with respect with one of the pipe sections 3.

It is noted that, while the compression rings of the prior art were designed to spread the force exerted in this situation so that such forces are not exerted from one pipe to the other as essentially a point force; nevertheless, the prior art devices were not as effective as the present invention. The prior art compression rings constructed of materials such as wood do allow some compression or collapse of the ring and eliminate some abrasion between the two opposed pipe surfaces 22. However, the present invention provides an improvement over the previously used materials.

In particular, as seen in FIG. 5, when the two pipe sections 3 become non-coaxially aligned relative to one another, the elastomer associated with the second component 33 is pinched and forced to bear some of the load. Since the elastomer of the interior component 33 tries to squeeze outwardly rather than support the load, it is believed that it extends away from the point of greatest impact or load, perhaps in a tear drop effect such as is shown in FIG. 5. This allows the elastomer of the interior component to extend radially inward along a portion 37 of the pipe surface 22 so as to more evenly distribute the load along the surface 37. In this manner the load or force applied between the two adjacent pipe sections 3 is applied over a substantially wider surface such that the force per square inch is substantially reduced, as compared to the situation if this phenomenon had not occurred, thereby also substantially reducing the likelihood of breakage.

It is noted that the example shown in FIG. 5 is for purposes of illustration of this concept only, as it is believed to occur, and is not intended to show an actual usage of a compression ring 10, since it is difficult, if not impossible, to physically see the shape of the components under great loads. That is, it has not been possible to actually see the shape formed by the interior component 33 under actual stress. However, the concept is supported by data, as described below.

In particular, two compression rings were tested. One of the rings was a prior art ring constructed of two pieces of joined plywood. The second ring was constructed in accordance with the present invention and in particular was constructed in the form illustrated in FIG. 3 with the first or exterior component 28 being constructed of plywood and the second or interior component 33 being constructed of polyurethane in approximately the same size ratios as shown in FIG. 4. Both the comparison ring and the ring of the present invention were of approximately the same shape and size. For both of the rings, a set of strain gauges was installed inside the end of a pipe section beneath one side of the rings such that the gauges would be able to measure the strain at various spaced locations around the pipe adjacent to the ring. A load was applied to each ring above the gauges and in a manner so as to simulate two pipe sections being urged against one another with a specific load and with one of the pipe sections being angled axially relative to the other. The results of this test are illustrated in FIG. 6 and FIG. 7.

Figure 6:
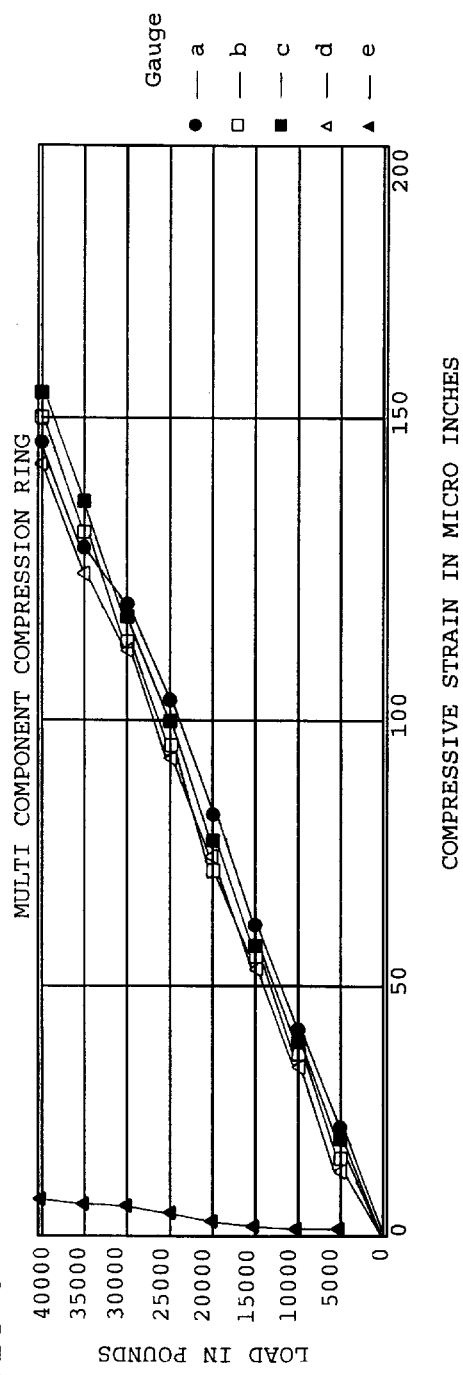
FIG. 6 is a chart showing compressive strain versus load as measured by gauges a through e located at five spaced positions along the compression ring in accordance with the present invention.
Figure 7:
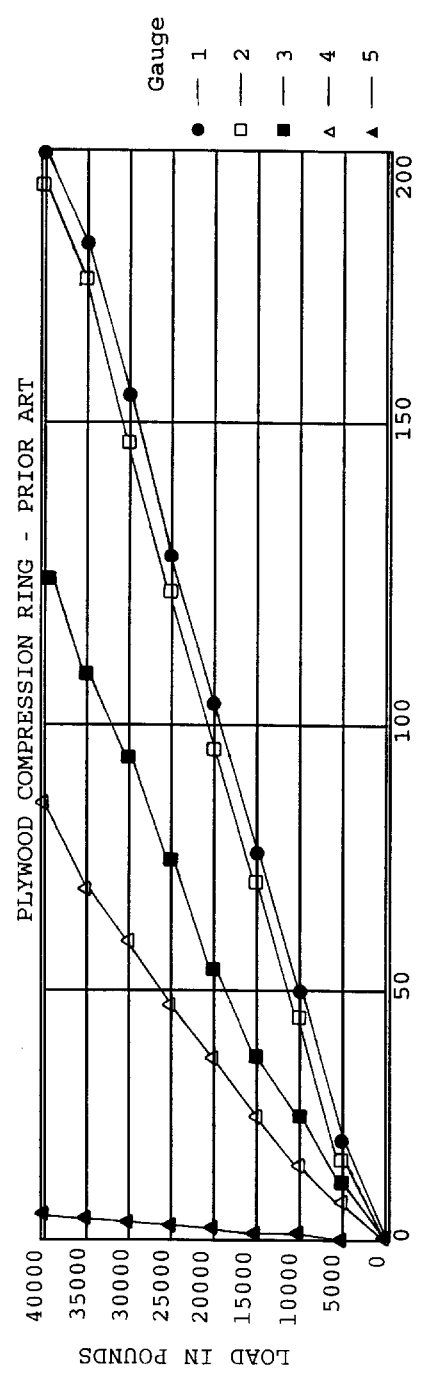
FIG. 7 is a chart similar to FIG. 6 showing compressive strain versus load as measured by gauges 1 through 5 located at five spaced positions along a plywood compression ring of the prior art wherein the gauges are positioned at approximately the same relative positions as with the compression ring in FIG. 6 to illustrate the differences in distribution of load between the plywood compression ring generating the data of FIG. 7 versus the multi-component compression ring of the present invention generating the data of FIG. 6.

In particular, the results of FIG. 6 show that there was a very close correlation between the strains measured by the spaced apart gauges (a to e) in association with the multi-component ring of the present invention. That is, the ring of the present invention spread the load over a wider surface area. FIG. 7 illustrates that with respect to the prior art ring at each of the different loading pressures, the strain measured by the gauges (1 to 5) varied substantially for at least two of the four gauges and spread ever increasingly apart as greater loads were placed on such a single composition compression ring. The results infer that the load applied to the single composition compression ring was not spread out substantially by the ring and, therefore, was transmitted through so as to be applied against a substantially smaller surface area of the pipe as compared to the multi-component ring of the present invention.

It is also noted that the highest compressive strain associated with the multi-component ring of the present invention was approximately 160 micro inches whereas the compressive strain on the single composition plywood ring reached approximately 200 micro inches. Consequently, the results suggests that the multi-component ring of the present invention both spreads a load and reduces the overall strain at any particular location for equivalent loads transferred through the compression ring of the present invention as compared to the prior art device.

It is foreseen that the compression ring of the present invention may be advantageously utilized to transfer loads or jacking pressures between sections of virtually any type of pipe in any type of application that applies such a load to one end of end of one of the pipe sections.

It is to be understood that while certain forms of the present invention have been illustrated and described herein, it is not to be limited to the specific forms or arrangement of parts described and shown.

What is claimed and desired to be secured by Letters Patent is as follows:

1. A compression ring for use in transferring loads between adjacent pipe during trenchless pipe installation; said ring configured to be directly positioned between facing ends of force transferring pipe and to transfer force between the pipe; said ring comprising:
   a) a first non-elastic component positioned so as to be located on opposite sides of a second elastic component.

2. The ring according to claim 1 wherein:
   a) said first component has a Poisson's ratio of not greater than about 0.3 and said second component has a Poisson's ratio substantially greater than 0.3.

3. A compression ring for use in pipe jacking to transfer a jacking load between pipe sections and configured to be directly positioned between facing ends of the pipe sections to transfer force between the pipe sections comprising:
   a) a first component having a Poisson's ratio of not greater than about 0.3 and a second component having a Poisson's ratio substantially greater than 0.3 with said first component surrounding said second component.

4. A multi-component compression ring for use in pipe jacking for transferring a jacking load between adjacent pipe sections; said ring being configured to be positioned directly between facing ends of the pipe sections and to transfer force between the pipe section; said ring having:
   a) a first component selected from the group consisting essentially of wood fiber materials, non-elastomeric cellular plastics and foams; and first component having a front section and a rear section;
   b) and a second component selected from the group consisting essentially of polyurethane, rubber, plasticized polyvinyl chloride, elastic silicones, nylon 11, nylon 12, ethylene acrylic, and ethylene vinyl acetate; said second component being positioned between said front and rear sections of said first component.

5. A compression ring for use in transferring loads between adjacent pipe during trenchless pipe installation; said ring comprising:
   a) a first non-elastic component joined with a second elastic component; and
   b) said first component includes two external sections with said second component sandwiched between said sections.

6. A compression ring for use in transferring loads between adjacent pipe during trenchless pipe installation; said ring comprising:
   a) a first non-elastic component joined with a second elastic component; and
   b) said first component is constructed from a wood fiber material and said second component is polyurethane.

7. A compression ring for use in pipe jacking to transfer a jacking load between pipe sections comprising:
   a) a first component having a Poisson's ratio of not greater than about 0.3 joined with a second component having a Poisson's ratio substantially greater than 0.3; and
   b) said first component has two sections and said second component is positioned between said sections.

8. A multi-component compression ring for use in pipe jacking for transferring a jacking load between adjacent pipe sections having:
   a) a first component selected from the group consisting essentially of wood fiber materials, non-elastomeric cellular plastics and foams;
   b) and a second component selected from the group consisting essentially of polyurethane, rubber, plasticized polyvinyl chloride, elastic silicones, nylon 11, nylon 12, ethylene acrylic, and ethylene vinyl acetate; said second component being positioned adjacent said first component; and
   c) said first component is constructed of plywood in two ring shaped sections and said second component is constructed of polyurethane having a generally circular cross section and being sandwiched between said plywood sections.

* * * * *